US008638211B2

(12) United States Patent
Cohn et al.

(10) Patent No.: US 8,638,211 B2
(45) Date of Patent: Jan. 28, 2014

(54) CONFIGURABLE CONTROLLER AND INTERFACE FOR HOME SMA, PHONE AND MULTIMEDIA

(75) Inventors: Alan Wade Cohn, Austin, TX (US); Gary Robert Faulkner, Austin, TX (US); James A. Johnson, Austin, TX (US); James Edward Kitchen, Austin, TX (US); David Leon Proft, Austin, TX (US); Corey Wayne Quain, Austin, TX (US)

(73) Assignee: iControl Networks, Inc., Redwood City, CA (US)

( * ) Notice: Subject to any disclaimer, the term of this patent is extended or adjusted under 35 U.S.C. 154(b) by 809 days.

(21) Appl. No.: 12/568,718

(22) Filed: Sep. 29, 2009

(65) Prior Publication Data
US 2010/0277300 A1 Nov. 4, 2010

Related U.S. Application Data

(60) Provisional application No. 61/174,366, filed on Apr. 30, 2009.

(51) Int. Cl.
*G08B 29/00* (2006.01)
(52) U.S. Cl.
USPC .......................................... 340/506
(58) Field of Classification Search
USPC ............ 340/506, 539.1, 539.14, 539.17, 541, 340/3.1; 715/764; 709/219
See application file for complete search history.

(56) References Cited

U.S. PATENT DOCUMENTS

| 7,298,253 | B2 * | 11/2007 | Petricoin et al. ............... 340/523 |
| 8,086,702 | B2 * | 12/2011 | Baum et al. .................... 709/220 |
| 2002/0027504 | A1 * | 3/2002 | Davis et al. .................... 340/540 |
| 2003/0062997 | A1 | 4/2003 | Naidoo et al. ................. 340/53 I |
| 2004/0117462 | A1 | 6/2004 | Bodin et al. ................... 709/220 |
| 2004/0117465 | A1 | 6/2004 | Bodin et al. ................... 709/222 |
| 2005/0216580 | A1 | 9/2005 | Raji et al. ....................... 709/223 |
| 2005/0276389 | A1 | 12/2005 | Hinkson et al. ................. 379/37 |
| 2006/0051122 | A1 | 3/2006 | Kawazu et al. ................. 399/88 |
| 2006/0067484 | A1 | 3/2006 | Elliot et al. ...................... 379/37 |
| 2006/0078344 | A1 | 4/2006 | Kawazu et al. ................. 399/69 |
| 2008/0001734 | A1 * | 1/2008 | Stilp et al. ................ 340/539.22 |
| 2009/0066789 | A1 | 3/2009 | Baum et al. .................... 348/143 |

(Continued)

FOREIGN PATENT DOCUMENTS

FR 2 584 217 1/1987
WO WO 99/34339 7/1999

(Continued)

OTHER PUBLICATIONS

"Control Panel Standard—Features for False Alarm Reduction," The Security Industry Association, © SIA 2009, pp. 1-48.

*Primary Examiner* — Phung Nguyen
(74) *Attorney, Agent, or Firm* — Gregory & Sawrie LLP

(57) ABSTRACT

A single platform for controller functionality for each of security, monitoring and automation, as well as providing a capacity to function as a bidirectional Internet gateway, is provided. Embodiments of the present invention provide such functionality by virtue of a configurable architecture that enables a user to adapt the system for the user's specific needs. Embodiments of the present invention further provide for remote access to the configurable controller, thereby providing for remote monitoring of the state of a dwelling and for remote control of home automation.

33 Claims, 10 Drawing Sheets

(56) References Cited

U.S. PATENT DOCUMENTS

| | | | |
|---|---|---|---|
| 2009/0070436 A1* | 3/2009 | Dawes et al. | 709/219 |
| 2009/0070477 A1 | 3/2009 | Baum et al. | 709/231 |
| 2009/0070681 A1 | 3/2009 | Dawes et al. | 715/736 |
| 2009/0070682 A1 | 3/2009 | Dawes et al. | 715/736 |
| 2009/0070692 A1* | 3/2009 | Dawes et al. | 715/764 |
| 2009/0074184 A1 | 3/2009 | Baum et al. | 380/205 |
| 2009/0077167 A1 | 3/2009 | Baum et al. | 709/203 |
| 2009/0077622 A1 | 3/2009 | Baum et al. | 726/1 |
| 2009/0077623 A1 | 3/2009 | Baum et al. | 726/1 |
| 2009/0077624 A1 | 3/2009 | Baum et al. | 726/1 |
| 2009/0134998 A1 | 5/2009 | Baum et al. | 340/539.1 |
| 2009/0138600 A1 | 5/2009 | Baum et al. | 709/226 |
| 2009/0138958 A1 | 5/2009 | Baum et al. | 726/12 |
| 2009/0165114 A1 | 6/2009 | Baum et al. | 726/12 |

FOREIGN PATENT DOCUMENTS

| | | |
|---|---|---|
| WO | WO 2004/098127 | 11/2004 |
| WO | WO 2005/091218 | 9/2005 |
| WO | WO 2009/006670 | 1/2009 |

* cited by examiner

CONFIGURABLE CONTROLLER AND INTERFACE FOR HOME SMA, PHONE AND MULTIMEDIA

CROSS REFERENCE TO RELATED APPLICATIONS

This invention claims priority from Provisional Patent Application Ser. No. 61/174,366, entitled "REMOTE SECURITY STATION," filed Apr. 30, 2009, and naming Alan Wade Cohn as inventor. This provisional patent application is incorporated herein by reference in its entirety and for all purposes.

FIELD OF THE INVENTION

Embodiments of the present invention relate generally to the field of home security, monitoring and automation, and specifically to a user-configurable controller for security, monitoring and automation.

BACKGROUND OF THE INVENTION

Residential electronics and control standards provide an opportunity for a variety of options for securing, monitoring, and automating residences. Wireless protocols for transmission of security information permit placement of a multitude of security sensors throughout a residence without a need for running wires back to a central control panel. Inexpensive wireless cameras also allow for placement of cameras throughout a residence to enable easy monitoring of the residence. A variety of home automation control protocols have also been developed to allow for centralized remote control of lights, appliances, and environmental apparatuses (e.g., thermostats). Traditionally, each of these security, monitoring and automation protocols require separate programming, control and monitoring stations. To the extent that home automation and monitoring systems have been coupled to home security systems, such coupling has involved including the automation and monitoring systems as slaves to the existing home security system. This limits the flexibility and versatility of the automation and monitoring systems and ties such systems to proprietary architectures.

A security system alerts occupants of a dwelling and emergency authorities of a violation of premises secured by the system. A typical security system includes a controller connected by wireless or wired connections to sensors deployed at various locations throughout the secured dwelling. In a home, sensors are usually deployed in doorways, windows, and other points of entry. Motion sensors can also be placed strategically within the home to detect unauthorized movement, while smoke and heat sensors can detect the presence of fire.

A home monitoring system provides an ability to monitor a status of a home so that a user can be made aware of any monitored state changes. For example, when a sensor is tripped, real-time alerts and associated data such as video or photo clips can be sent to the user (e.g., to a network-connected computer or to a mobile device).

A home automation system enables automation and remote control of lifestyle conveniences such as lighting, heating, cooling, and appliances. Typically these various lifestyle conveniences are coupled to a controller via wireless or wired communications protocols. A central device is then used to program the various lifestyle conveniences.

Rather than having multiple devices to control each of the security, monitoring and automation environments, it is desirable to have a centralized controller capable of operating in each environment, thereby reducing the equipment needed in a dwelling. It is further desirable for such a controller to function as a gateway for external network access so that a user can control or monitor devices in locations remote from the dwelling. It is further desirable for such a combined controller and gateway to provide configurable flexibility in how devices in the various environments are monitored and controlled.

SUMMARY OF THE INVENTION

Embodiments of the present invention provide a single platform that provides controller functionality for each of security, monitoring and automation, as well as providing a capacity to function as a bidirectional Internet gateway. Embodiments of the present invention provide such functionality by virtue of a configurable architecture that enables a user to adapt the system for the user's specific needs. Embodiments of the present invention further provide for remote access to the configurable controller, thereby providing for remote monitoring of the state of a dwelling and for remote control of home automation.

One embodiment of the present invention includes memory for storing configuration information for security sensors, monitoring devices and automation devices, communication interfaces for communicating with one or more of these devices and a remote server, and a processor for interpreting event signals from the security sensors and transmitting data associated with the event signals to the remote server. One aspect of this embodiment of the present invention provides for the interpretation of the event signals to be performed in accordance with the configuration information of the associated security sensor. A further aspect of this embodiment of the present invention provides for the transmitted event-related data to conform to the associated configuration information.

A further aspect of the above embodiment of the present invention provides for a display device coupled to the processor for displaying event-related data. Another aspect of the above embodiment of the present invention provides for an input device coupled to the processor for inputting configuration information associated with a sensor device, a monitoring device or an automation device. Further aspects of the present invention provides for receiving and transmitting the configuration information from and to the remote server.

An additional aspect of the above embodiment of the present invention provides for generating configuration information for a monitoring device and providing that configuration information to the monitoring device. Another aspect of the above embodiment of the present invention provides for receiving data from a monitoring device and transmitting data from the monitoring device to the remote server. A further aspect of the above embodiment of the present invention provides for receiving data from a monitoring device and displaying that data on a display coupled to the processor. Another aspect of the above embodiment of the present invention provides for communicating control information to a monitoring device.

An additional aspect of the above embodiment of the present invention provides for communication of control information to an automation device. Such control information can be provided by an input device coupled to the processor or by the remote server.

Another aspect of the above embodiment of the present invention provides for display and execution of widget application programs. The widget application programs can be selected from a set of available widget application programs on the remote server. The remote server can then distribute the selected widget application programs to the device.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a single platform that provides controller functionality for each of security, monitoring and automation, as well as providing a capacity to function as a bidirectional Internet gateway. Embodiments of the present invention provide such functionality by virtue of a configurable architecture that enables a user to adapt the system for the user's specific needs. Embodiments of the present invention further provide for remote access to the configurable controller, thereby providing for remote monitoring of the state of a dwelling and for remote control of home automation.

Architectural Overview

Embodiments of the configurable security, monitoring and automation (SMA) controller of the present invention provide not only for communicating with and interpreting signals from sensors and devices within a dwelling, but also for accessing and monitoring those sensors and devices from locations remote to the dwelling. Embodiments of the SMA controller provide such capability through linkages to external servers via access networks such as the Internet, provider network, or a cellular network. The external servers provide a portal environment through which a user can, for example, monitor the state of sensors coupled to the SMA controller in real-time, configure the controller, and provide controlling information to the SMA controller. The servers can further automatically provide information to a user via remote devices such as mobile phones, computers, and pagers. The servers further provide a connection to a traditional security central station, which can then contact authorities in the event of an alarm condition being detected by the SMA controller in the dwelling.

Figure 1:
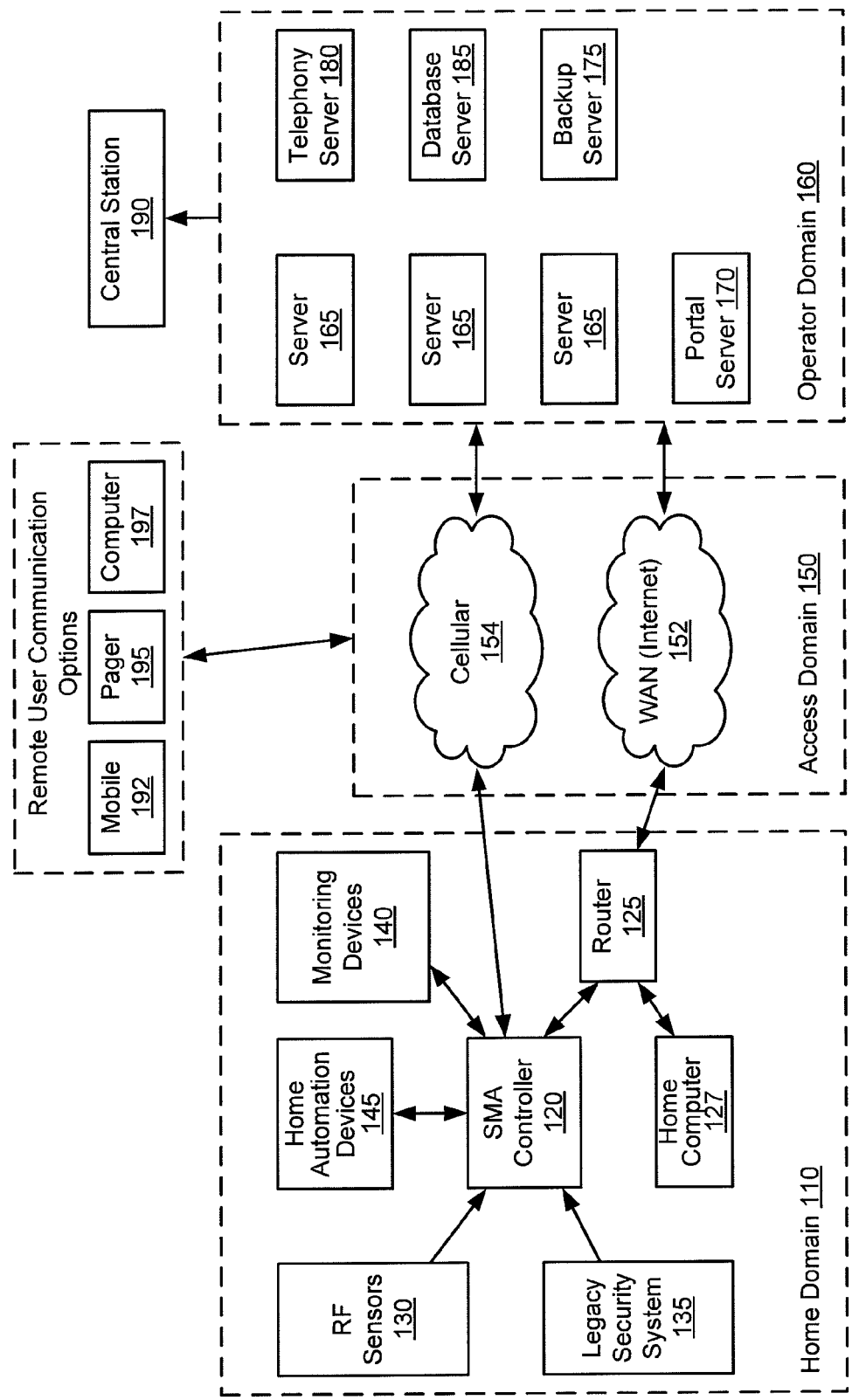
FIG. 1 is a simplified block diagram illustrating an architecture including a set of logical domains and functional entities within which embodiments of the present invention interact.

FIG. 1 is a simplified block diagram illustrating an architecture including a set of logical domains and functional entities within which embodiments of the present invention interact. A home domain 110 includes an embodiment of the SMA controller 120. The home domain is coupled via an access domain 150 to an operator domain 160 that includes various servers. The servers are in turn coupled to a central station 190 and to various remote user communication options.

The home domain refers to a collection of security, monitoring and automation entities within a dwelling or other location having SMA devices. SMA controller 120 is a device that provides an end-user SMA interface to the various SMA entities within home domain 110. SMA controller 120 further acts as a gateway interface between home domain 110 and operator domain 160. SMA gateway 120 provides such gateway access to operator domain 160 via a network router 125. Network router 125 can be coupled to SMA controller 120 and to home network devices such as home computer 127 via either hard wired or wireless connections. A network router 125 coupled to a broadband modem (e.g., a cable modem or DSL modem) serves as one link to networks in access domain 150.

SMA devices within home domain 110 can include a variety of RF or wireless sensors 130 whose signals are received and interpreted by SMA gateway 120. RF sensors 130 can include, for example, door or window sensors, motion detectors, smoke detectors, glass break detectors, inertial detectors, water detectors, carbon dioxide detectors, and key fob devices. SMA gateway 120 can be configured to react to a change in state of any of these detectors. In addition to acting and reacting to changes in state of RF sensors 130, SMA controller 120 also can be coupled to a legacy security system 135. SMA controller 120 controls the legacy security system by interpreting signals from sensors coupled to the legacy security system and reacting in a user-configured manner. SMA gateway 120, for example, will provide alarm or sensor state information from legacy security system 135 to servers in operator domain 160 that may ultimately inform central station 190 to take appropriate action.

SMA gateway 120 can also be coupled to one or more monitoring devices 140. Monitoring devices 140 can include, for example, still and video cameras that provide images that are viewable on a screen of SMA gateway 120 or a remotely connected device. Monitoring devices 140 can be coupled to SMA gateway 120 either wirelessly (e.g., WiFi via router 125) or other connections.

Home automation devices 145 can also be coupled to and controlled by SMA gateway 120. SMA gateway 120 can be configured to interact with a variety of home automation protocols, such as, for example, Z-Wave and ZigBee.

Embodiments of SMA controller 120 can be used to configure and control home security devices (e.g., 130 and 135), monitoring devices 140 and automation devices 145, either directly or by providing a gateway to remote control via servers in operator domain 160. SMA controller 120 communicates with servers residing in operator domain 160 via networks in access domain 150. Broadband communication can be provided by coupling SMA controller 120 with a network router 125, which in turn is coupled to a wide area network 152, such as a provider network or the Internet, via an appropriate broadband modem. The router can be coupled to the wide area network through cable broadband, DSL, and the like. Wide area network 152, in turn, is coupled to servers in operator domain 160 via an appropriate series of routers and firewalls (not shown). SMA controller 120 can include additional mechanisms to provide a communication with the operator domain. For example, SMA controller 120 can be configured with a cellular network transceiver that permits communication with a cellular network 154. In turn, cellular network 154 can provide access via routers and firewalls to servers in operator domain 160. Embodiments of SMA controller 120 are not limited to providing gateway functionality via cellular and dwelling-based routers and modems. For example, SMA gateway 120 can be configured with other network protocol controllers such as WiMAX satellite-based broadband, direct telephone coupling, and the like.

Operator domain 160 refers to a logical collection of SMA servers and other operator systems in an operator's network that provide end-user interfaces, such as portals accessible to subscribers of the SMA service, that can configure, manage and control SMA elements within home domain 110. Servers in operator domain 160 can be maintained by a provider (operator) of subscriber-based services for SMA operations. Examples of providers include cable providers, telecommunications providers, and the like. A production server architecture in operator domain 160 can support SMA systems in millions of home domains 110.

Individual server architectures can be of a variety of types, and in one embodiment, the server architecture is a tiered Java2 Enterprise Edition (J2EE) service oriented architecture. Such a tiered service oriented architecture can include an interface tier, a service tier, and a data access logic tier. The interface tier can provide entry points from outside the server processes, including, for example, browser web applications, mobile web applications, web services, HTML, XHTML, SOAP, and the like. A service tier can provide a variety of selectable functionality passed along by the operator to the end user. Service tiers can relate to end user subscription levels offered by the operator (e.g., payment tiers corresponding to "gold" level service, "silver" level service and "bronze" level service). Finally the data access logic tier provides access to various sources of data including database servers.

FIG. 1 illustrates an example set of servers that can be provided in operator domain 160. Servers 165 can support all non-alarm and alarm events, heartbeat, and command traffic between the various servers and SMA controllers 120. Servers 165 can also manage end-user electronic mail and SMS notification, as well as integration with provider billing, provisioning, inventory, tech support systems, and the like.

A portal server 170 can provide various user interface applications, including, for example, a subscriber portal, a mobile portal, and a management portal. A subscriber portal is an end-user accessible application that permits an end-user to access a corresponding SMA controller remotely via standard web-based applications. Using such a subscriber portal provides access to the same SMA functions that an interface directly coupled to the SMA controller would provide, plus additional functions such as alert and contact management, historical data, widget and camera management, account management, and the like. A mobile portal can provide all or part of the access available to an end-user via the subscriber portal. A mobile portal can be limited, however, to capabilities of an accessing mobile device (e.g., touch screen or non-touch screen cellular phones). A management portal provides an operator representative access to support and manage SMA controllers in home domains 110 and corresponding user accounts via a web-based application. The management portal can provide tiers of management support so that levels of access to user information can be restricted based on authorization of a particular employee.

Telephony server 180 can process and send information related to alarm events received from SMA controllers 120 to alarm receivers at central monitoring station 190. A server 165 that processes the alarm event makes a request to telephony server 180 to dial the central station's receiver and send corresponding contact information. Telephony server 180 can communicate with a plurality of central stations 190. Server 165 can determine a correct central station to contact based upon user account settings associated with the transmitting SMA controller. Thus, alarms can be routed to different central stations based upon user accounts. Further, accounts can be transferred from one central station to another by modifying user account information. Telephony server 180 can communicate with alarm receivers at central station 190 using, for example, a security industry standard contact identification protocol (e.g., dual-tone multi-frequency [DTMF]) and broadband protocols.

A backup server 175 can be provided to guarantee that an alarm path is available in an event that one or more servers 165 become unavailable or inaccessible. A backup server 175 can be co-located to the physical location of servers 165 to address scenarios in which one or more of the servers fail. Alternatively, a backup server 175 can be placed in a location remote from servers 165 in order to address situations in which a network failure or a power failure causes one or more of servers 165 to become unavailable. SMA controllers 120 can be configured to transmit alarm events to a backup server 175 if the SMA controller cannot successfully send such events to servers 165.

A database server 185 provides storage of all configuration and user information accessible to other servers within operator domain 160. Selection of a type of database provided by database server 185 can be dependent upon a variety of criteria, including, for example, scalability and availability of data. One embodiment of the present invention uses database services provided by an ORACLE database.

A server 165 in operator domain 160 provides a variety of functionality. Logically, a server 165 can be divided into the following functional modules: a broadband communication module, a cellular communication module, a notification module, a telephony communication module, and an integration module.

The broadband communication module manages broadband connections and message traffic from a plurality of SMA controllers 110 coupled to server 165. Embodiments of the present invention provide for the broadband channel to be a primary communication channel between an SMA controller 120 and servers 165. The broadband communication module handles a variety of communication, including, for example, all non-alarm and alarm events, broadband heartbeat, and command of traffic between server 165 and SMA controller 120 over the broadband channel. Embodiments of the present invention provide for an always-on persistent TCP socket connection to be maintained between each SMA controller and server 165. A variety of protocols can be used for communications between server 165 and SMA controller 120 (e.g., XML over TCP, and the like). Such communication can be secured using standard transport layer security (TLS) technologies. Through the use of an always-on socket connection, servers 165 can provide near real-time communication between the server and an SMA controller 120. For example, if a user has a subscriber portal active and a zone is tripped within home domain 110, a zone fault will be reflected in near real-time on the subscriber portal user interface.

The cellular communication module manages cellular connections and message traffic from SMA controllers 120 to a server 165. Embodiments of the present invention use the cellular channel as a backup communication channel to the broadband channel. Thus, if a broadband channel becomes unavailable, communication between an SMA controller and a server switches to the cellular channel. At this time, the cellular communication module on the server handles all non-alarm and alarm events, and command traffic from an SMA controller. When a broadband channel is active, heartbeat messages can be sent periodically on the cellular channel in order to monitor the cellular channel. When a cellular protocol communication stack is being used, a TCP socket connection can be established between the SMA controller and server to ensure reliable message delivery for critical messages (e.g., alarm events and commands). Once critical messages have been exchanged, the TCP connection can be shut down thereby reducing cellular communication costs. As with broadband communication, XMPP can be the messaging protocol used for such communications. Similarly, such communication can be secured using TLS and SASL authentication protocols. Non-critical messages between an SMA controller and a server can be sent using UDP. A compressed binary protocol can be used as a messaging protocol for such communications in order to minimize cellular costs for such message traffic. Such messages can be secured using an encryption algorithm, such as the tiny encryption algorithm (TEA). Cellular communication can be established over two network segments: the GSM service provider's network that provides a path between an SMA controller and a cellular access point, and a VPN tunnel between the access point and an operator domain data center.

A notification module of server 165 determines if and how a user should be notified of events generated by their corresponding SMA controller 120. A user can specify who to notify of particular events or event types and how to notify the user (e.g., telephone call, electronic mail, text message, page, and the like), and this information is stored by a database server 185. When events such as alarm or non-alarm events are received by a server 165, those events can be past asynchronously to the notification module, which determines if, who and how to send those notifications based upon the user's configuration.

The telephony communication module provides communication between a server 165 and telephony server 180. When a server 165 receives and performs initial processing of alarm events, the telephony communication module forwards those events to a telephony server 180 which in turn communicates with a central station 190, as discussed above.

The integration module provides infrastructure and interfaces to integrate a server 165 with operator business systems, such as, for example, billing, provisioning, inventory, tech support, and the like. An integration module can provide a web services interface for upstream integration that operator business systems can call to perform operations like creating and updating accounts and querying information stored in a database served by database server 185. An integration module can also provide an event-driven framework for downstream integration to inform operator business systems of events within the SMA system.

SMA Controller Architecture

Figure 2:
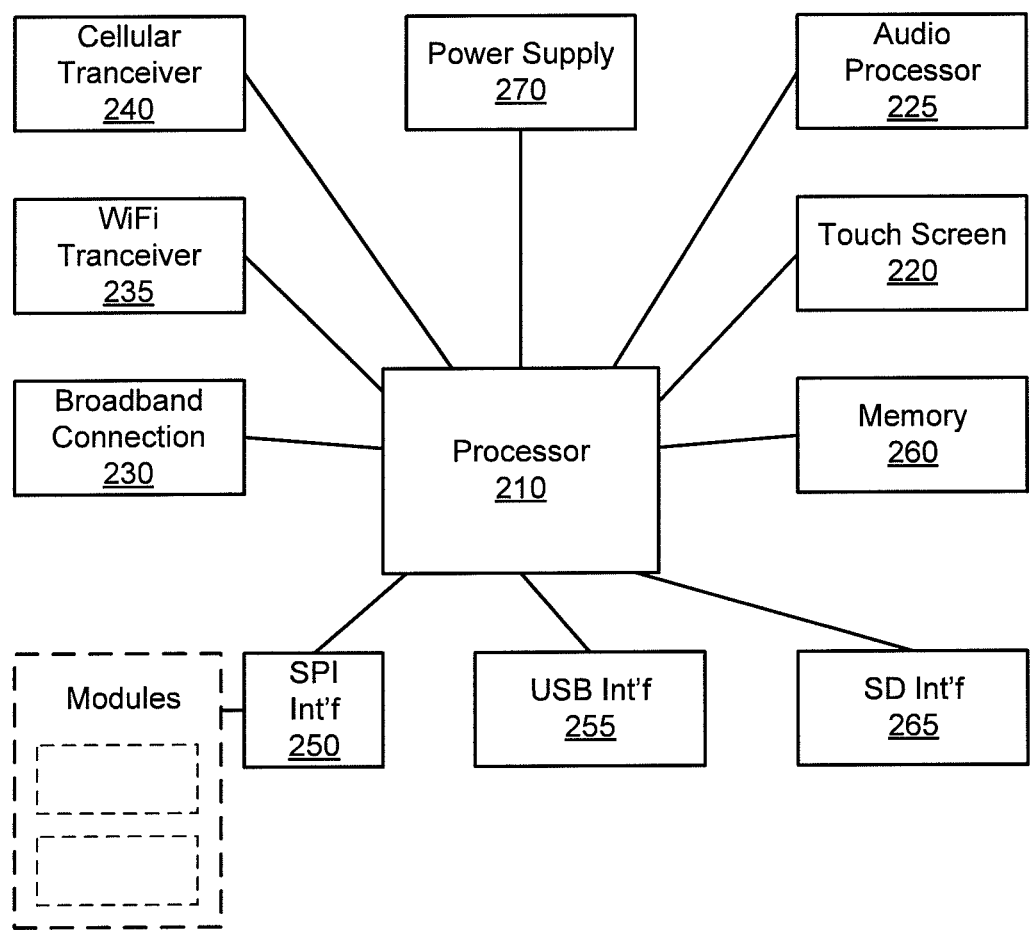
FIG. 2 is a simplified block diagram illustrating a hardware architecture of an SMA controller, according to one embodiment of the present invention.

FIG. 2 is a simplified block diagram illustrating a hardware architecture of an SMA controller, according to one embodiment of the present invention. A processor 210 is coupled to a plurality of communications transceivers, interface modules, memory modules, and user interface modules. Processor 210, executing firmware discussed below, performs various tasks related to interpretation of alarm and non-alarm signals received by SMA controller 120, interpreting reactions to those signals in light of configuration information either received from a server (e.g., server 165) or entered into an interface provided by SMA controller 120 (e.g., a touch screen 220). Embodiments of the present invention can use a variety of processors, for example, an ARM core processor such as a FREESCALE i.MX35 multimedia applications processor.

SMA controller 120 can provide for user input and display via a touch screen 220 coupled to processor 210. Processor 210 can also provide audio feedback to a user via use of an audio processor 225. Audio processor 225 can, in turn, be coupled to a speaker that provides sound in home domain 110. SMA controller 120 can be configured to provide a variety of sounds for different events detected by sensors associated with the SMA controller. Such sounds can be configured by a user so as to distinguish between alarm and non-alarm events.

As discussed above, an SMA controller 120 can communicate with a server 165 using different network access means. Processor 210 can provide broadband access to a router (e.g., router 125) via an Ethernet broadband connection PHY 130 or via a WiFi transceiver 235. The router can then be coupled to or be incorporated within an appropriate broadband modem. Cellular network connectivity can be provided by a cellular transceiver 240 that is coupled to processor 210. SMA controller 120 can be configured with a set of rules that govern when processor 210 will switch between a broadband connection and a cellular connection to operator domain 160.

In order to communicate with the various sensors and devices within home domain 110, processor 210 can be coupled to one or more transceiver modules via, for example, a serial peripheral interface such as a SPI bus 250. Such transceiver modules permit communication with sensors of a variety of protocols in a configurable manner. Embodiments of the present invention can use a Bosch transceiver to communicate with a variety of RF sensors 130. Similarly, home automation transceivers that communicate using Z-Wave or ZigBee protocols can be coupled to processor 210 via SPI 250. If SMA controller 120 is coupled to a legacy security system 135, then a module permitting coupling to the legacy security system can be coupled to processor 210 via SPI 250. Other protocols can be provided for via such plug-in modules including, for example, digital enhanced cordless telecommunication devices (DECT). In this manner, an SMA controller 120 can be configured to provide for control of a variety of devices and protocols known both today and in the future. In addition, processor 210 can be coupled to other types of devices (e.g., transceivers or computers) via a universal serial bus (USB) interface 255.

In order to locally store configuration information for SMA controller 120, a memory 260 is coupled to processor 210. Additional memory can be coupled to processor 210 via, for example, a secure digital interface 265. A power supply 270 is also coupled to processor 210 and to other devices within SMA controller 120 via, for example, a power management controller module.

SMA controller 120 is configured to be a customer premises equipment device that works in conjunction with server counterparts in operator domain 160 in order to perform functions required for security monitoring and automation. Embodiments of SMA controller 120 provide a touch screen interface (e.g., 220) into all the SMA features. Via the various modules coupled to processor 210, the SMA controller bridges the sensor network, the control network, and security panel network to broadband and cellular networks. SMA controller 120 further uses the protocols discussed above to carry the alarm and activity events to servers in the operator domain for processing. These connections also carry configuration information, provisioning commands, management and reporting information, security authentication, and any real-time media such as video or audio.

Figure 3:
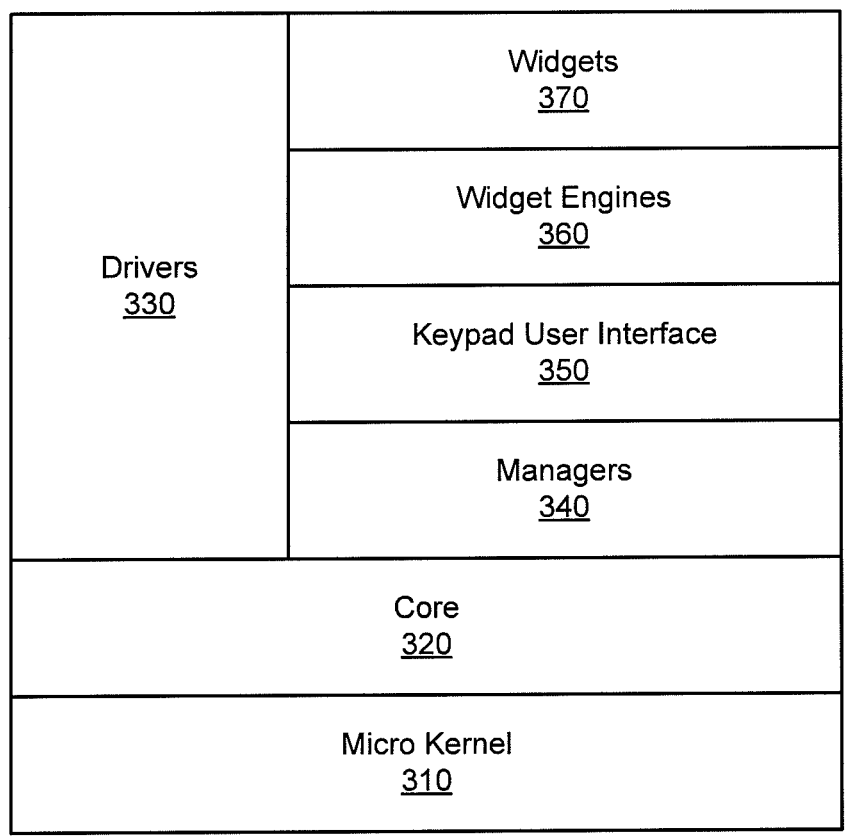
FIG. 3 is a simplified block diagram illustrating a logical stacking of an SMA controller's firmware architecture, usable with embodiments of the present invention.

FIG. 3 is a simplified block diagram illustrating a logical stacking of an SMA controller's firmware architecture, usable with embodiments of the present invention. Since SMA controller 120 provides security functionality for home domain 110, the SMA controller should be a highly available system. High availability suggests that the SMA controller be ready to serve an end-user at all times, both when a user is interacting with the SMA controller through a user interface and when alarms and other non-critical system events occur, regardless of whether a system component has failed. In order to provide such high availability, SMA controller 120 runs a micro-kernel operating system 310. An example of a micro-kernel operating system usable by embodiments of the present invention is a QNX real-time operating system. Under such a micro-kernel operating system, drivers, applications, protocol stacks and file systems run outside the operating system kernel in memory-protected user space. Such a micro-kernel operating system can provide fault resilience through features such as critical process monitoring and adaptive partitioning. As a result, components can fail, including low-level drivers, and automatically restart without affecting other components or the kernel and without requiring a reboot of the system. A critical process monitoring feature can automatically restart failed components because those components function in the user space. An adaptive partitioning feature of the micro kernel operating system provides guarantees of CPU resources for designated components, thereby preventing a component from consuming all CPU resources to the detriment of other system components.

A core layer 320 of the firmware architecture provides service/event library and client API library components. A client API library can register managers and drivers to handle events and to tell other managers or drivers to perform some action. The service/event library maintains lists of listeners for events that each manager or driver detects and distributes according to one of the lists.

Driver layer 330 interacts with hardware peripherals of SMA controller 120. For example, drivers can be provided for touch screen 220, broadband connection 230, WiFi transceiver 235, cellular transceiver 240, USB interface 255, SD interface 265, audio processor 225, and the various modules coupled to processor 210 via SPI interface 250. Manager layer 340 provides business and control logic used by the other layers. Managers can be provided for alarm activities, security protocols, keypad functionality, communications functionality, audio functionality, and the like.

Keypad user interface layer 350 drives the touch screen user interface of SMA controller 120. An example of the touch screen user interface consists of a header and a footer, widget icons and underlying widget user interfaces. Keypad user interface layer 350 drives these user interface elements by providing, for example, management of what the system Arm/Disarm interface button says and battery charge information, widget icon placement in the user face area between the header and footer, and interacting with widget engine layer 360 to display underlying widget user interface when a widget icon is selected.

In embodiments of the present invention, typical SMA controller functions are represented in the touch screen user interface as widgets (or active icons). Widgets provide access to the various security monitoring and automation control functions of SMA controller 120 as well as providing support for multi-media functionality through widgets that provide, for example, news, sports, weather and digital picture frame functionality. A main user interface screen can provide a set of icons, each of which represents a widget. Selection of a widget icon can then launch the widget. Widget engine layer 360 includes, for example, widget engines for native, HTML and FLASH-based widgets. Widget engines are responsible for displaying particular widgets on the screen. For example, if a widget is developed in HTML, selection of such a widget will cause the HTML widget engine to display the selected widget or touch screen 220. Information related to the various widgets is provided in widget layer 370.

Figure 4:
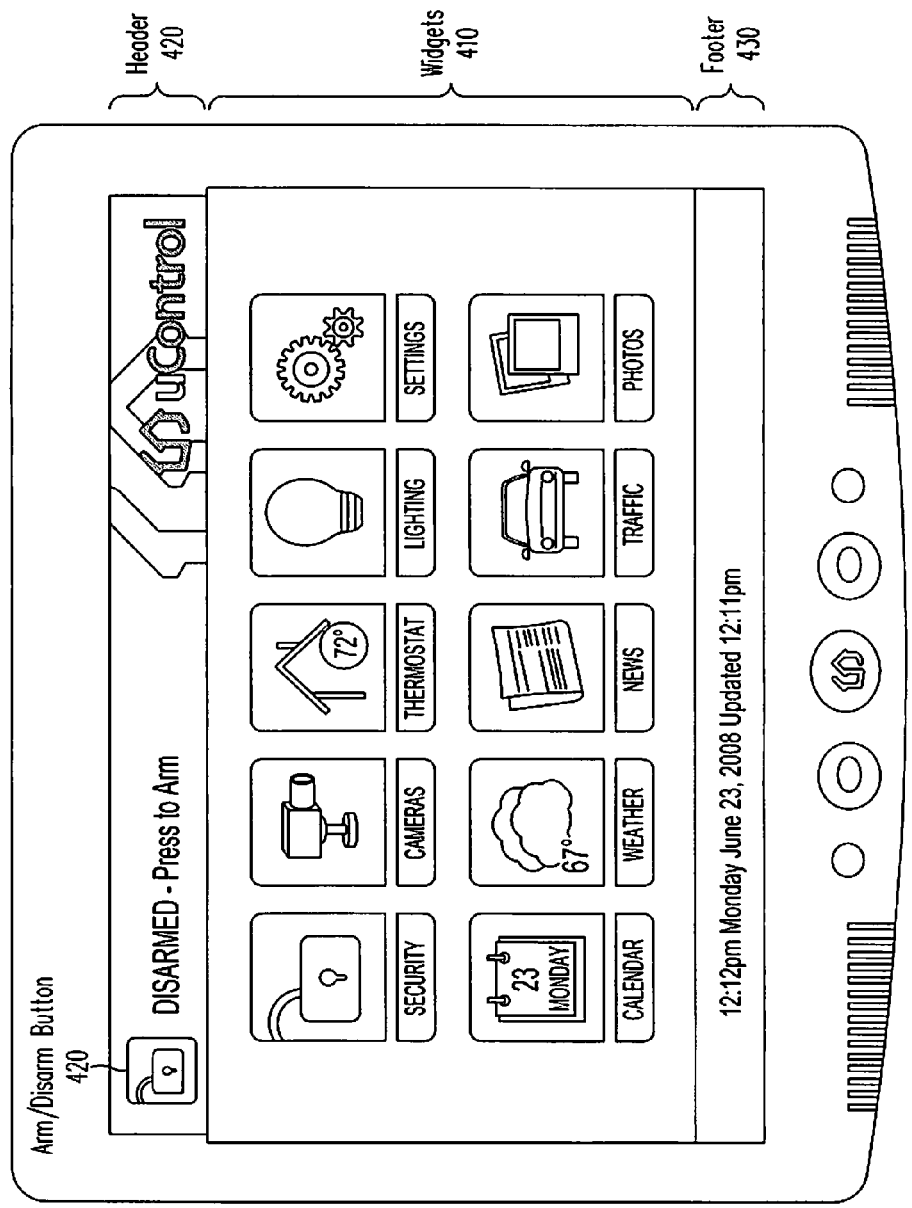
FIG. 4 is an illustration of an example user interface for an SMA controller 120, according to an embodiment of the present invention.

FIG. 4 is an illustration of an example user interface for an SMA controller 120, according to an embodiment of the present invention. The illustrated user interface provides a set of widget icons 410 that provide access to functionality of SMA controller 120. As illustrated, widgets are provided to access security functionality, camera images, thermostat control, lighting control, and other settings of the SMA controller. Additional widgets are provided to access network-based information such as weather, news, traffic, and digital picture frame functionality. A header 420 provides access to an Arm/Disarm button 425 that allows for arming the security system or disarming it. Additional information can be provided in the header, such as, for example, network status messages. A footer 430 can provide additional status information such as time and date, as displayed.

A user can select widgets corresponding to desired functionality. Embodiments of the present invention provide for access to widgets via portal server 170. A provider of operator domain 160 can determine functionality accessible to users, either for all users or based upon tiers of users (e.g., subscription levels associated with payment levels). A user can then select from the set of accessible widgets and the selected widgets will be distributed and displayed on the user interface of SMA controller 120. Configurability of SMA controller 120 is also driven by user determined actions and reactions to sensor stimulus.

SMA Controller Configurability

In accord with embodiments of the present invention, SMA controller 120 can be configured by a user in order to provide desired functionality in home domain 110. In addition to the hardware configurable options discussed above (e.g., modules coupled to SPI interface 250), SMA controller 120 provides for additional configuration through the use of software and/or firmware. For example, SMA controller 120 can be configured to receive signals from a variety of security sensors (e.g., RF sensors 130) and to associate those sensors with the physical environment of home domain 110. In addition, SMA controller 120 can be configured to receive still and video information from one or more cameras, provide a variety of programs and utilities to a user, and is configurable to communicate with a variety of home automation devices.

Figure 5:
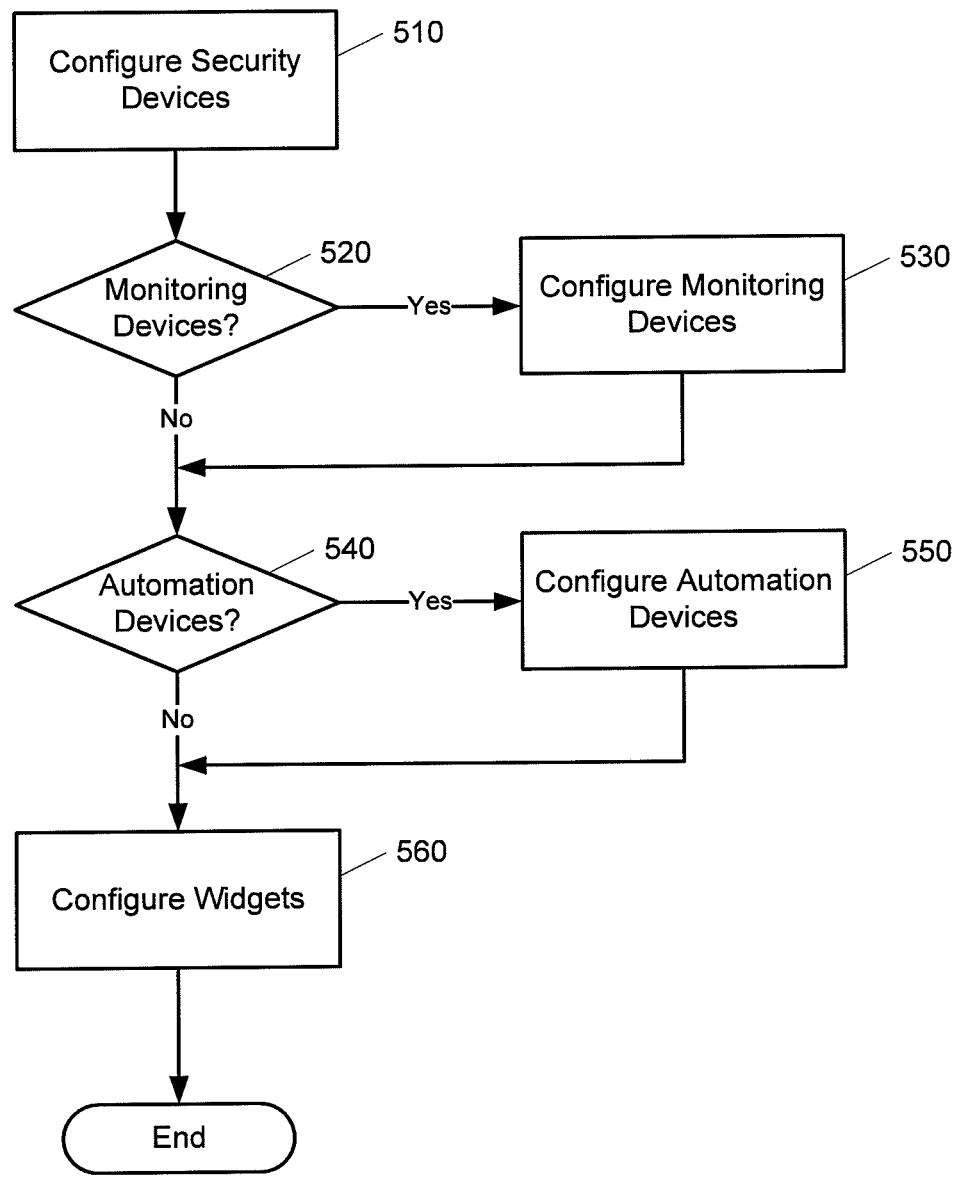
FIG. 5 is a simplified flow diagram illustrating steps performed in a configuration process of an SMA controller, in accord with embodiments of the present invention.

FIG. 5 is a simplified flow diagram illustrating steps performed in a configuration process of an SMA controller, in accord with embodiments of the present invention. Embodiments of an SMA controller will typically be configured with security sensor information, either from RF sensors 130 or from a legacy security system 135. Therefore, an SMA controller will be configured to access and interpret information related to those security sensors (510).

A determination can then be made as to whether or not a user is including security cameras in home domain 110 (520). If cameras are included in the home domain, then a series of steps related to camera configuration is performed (530). Similarly, a determination can be made as to whether or not home automation devices are to be controlled by the SMA controller (540). If so, then a series of steps can be performed to configure the SMA controller to access those home automation devices (550).

A user can then perform steps necessary to configuring widgets accessible via the SMA controller (560). As discussed above, the user may access a portal server (e.g., 170) to select and configure those widgets that are desirable to be accessed at SMA controller 120. Once these configuration steps are performed, the SMA controller can be made available to perform tasks related to securing, monitoring, and providing automation control to home domain 110.

SMA controller 120 can be configured to receive and interpret signals from a variety of security sensors. Such sensors can include, for example, door/window sensors that can detect opening and closing of a door or window, motion detectors that can detect movement in an area of interest, smoke detectors, glass break detectors, inertia detectors, and key fobs. In order to usefully interpret signals from such detectors, embodiments of SMA controller 120 can search for signals from such sensors and be configured with information related to the location and tasks of those sensors.

Figure 6:
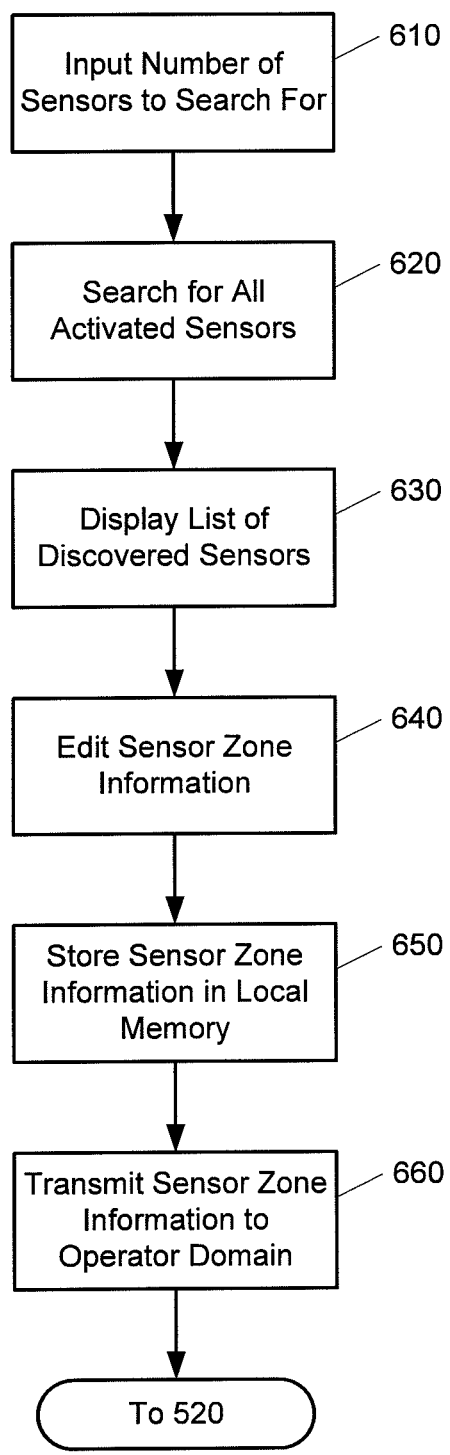
FIG. 6 is a simplified flow diagram illustrating steps performed in configuring security sensors (e.g., 510), in accord with embodiments of the present invention.

FIG. 6 is a simplified flow diagram illustrating steps performed in configuring security sensors (e.g., 510), in accord with embodiments of the present invention. A user of a security system incorporating SMA controller 120 (e.g., an owner or resident of home domain 110) can decide, based upon the needs within the home domain, the types and number of security sensors needed to secure the home domain. SMA controller 120, via a touch screen input device, for example, can be told how many such sensors to search for (610). The SMA controller can then search for all activated sensors providing a linking message to the SMA controller (620). Such a linking message can provide sensor information including, for example, a unique identification number for the sensor and sensor type information. A touch screen interface for SMA controller 120 can then provide to the user a display indicating information related to all sensors found during the search (630).

Once presented with information related to all the located sensors, a user can then edit that information to provide specifics as to physical, or zone, location of the sensor within the home domain and other characteristics related to the zone of the sensor (640). For example, a touch screen display 220 coupled to SMA controller 120 can provide a list of all located sensors from which the user can select a specific sensor to define or edit information related to that sensor. The information related to the sensors and zones is then stored in a local memory of the SMA controller 120 (e.g., memory 260) (650). The SMA controller can also transmit the sensor zone information to be stored in a server in operator domain 160 via an available broadband connection (660).

Figure 7:
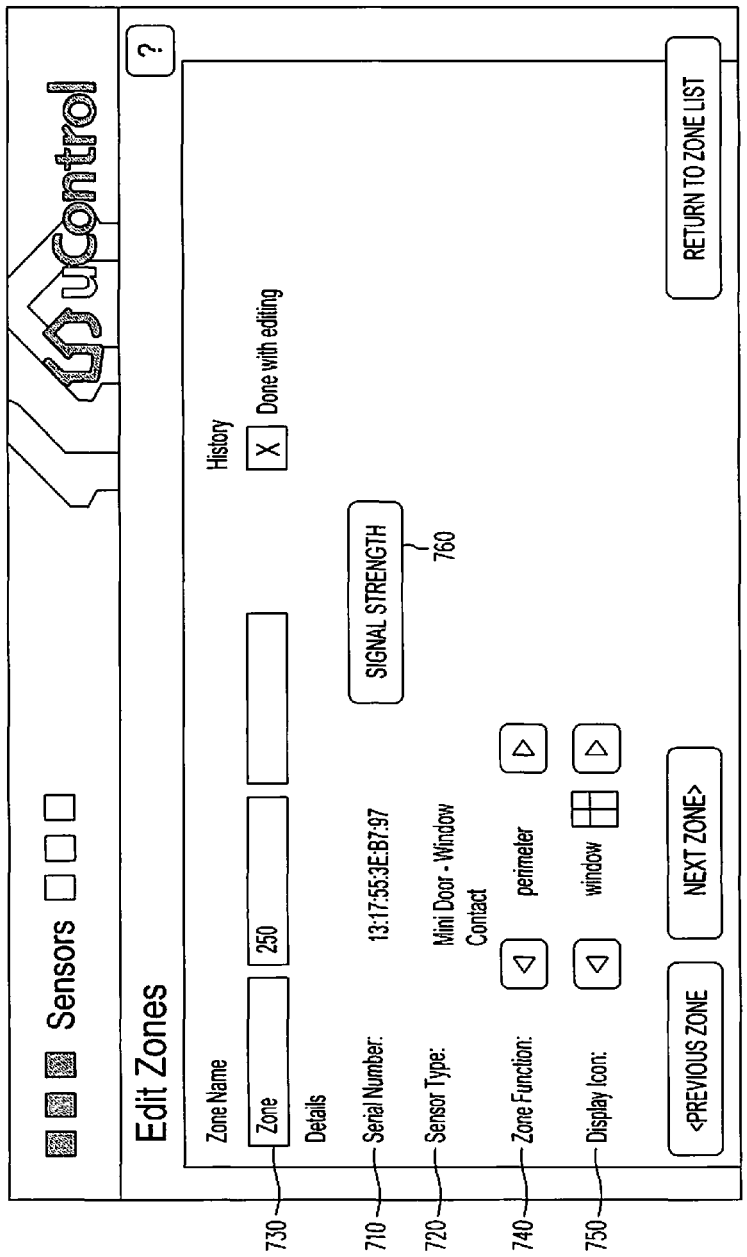
FIG. 7 is an illustration of a display that can be provided by embodiments of the present invention to permit editing of sensor information (e.g., sensor zone information).

FIG. 7 is an illustration of a display that can be provided by embodiments of the present invention to permit editing of sensor information (e.g., sensor zone information). As illustrated, the display can provide information such as the unique identifier of the sensor (serial number 710) and the sensor type (sensor type 720). As indicated above, unique identifier and sensor type information is provided by the sensor during the search and location process. Through a display such as that illustrated in FIG. 7, a user can define additional zone characteristics related to the sensor. For example, a user can define or select a zone name 730 to associate with the sensor. Such a zone name can be entered by a user through the use of a touch screen-based keyboard or selected from a list of common names displayed on the touch screen.

A zone function 740 can also be provided to be associated with the sensor. A zone function determines behavior of the zone and is dependent on the zone type. For example, a door/window sensor can function as an entry/exit zone or as a perimeter zone. Each zone type can have one or more configurable zone functions. For example, a motion detector can have a zone function of interior follower, a smoke/heat detector can have a zone function of 24-hour fire monitoring, a glass break detector can have a zone function of a perimeter zone, and an inertia detector can have an entry/exit zone function or a perimeter zone function.

Selection of a zone function definition alters how the security system acts and reacts to signals received from a sensor in that zone. The following table illustrates examples of zone functions and their associated action/reaction definitions.

TABLE 1

| Zone Function | Definition |
| --- | --- |
| Entry/Exit | Allow exiting the home domain when the system is arming and will begin an entry delay when opened if the system is armed. Zone can be bypassed and can have specific tones assigned for open and close events. |
| Perimeter | Generate an alarm immediately if tripped while the system is armed. Can be bypassed and can have specific tones assigned for open and close events. |
| Interior Follower | Protect the internal spaces of the home domain and trigger an immediate alarm if the system is armed in away mode. Zone is not armed when the system is in armed stay mode. Can be bypassed and can have specific activity/non activity tones assigned. |
| 24-Hour Fire | Generate an immediate fire alarm if triggered. Zone cannot be bypassed. |
| 24-Hour Monitor | Generate notifications in the home and will beep the keypad but will not sound the full alarm. Can be bypassed. |
| 24-Hour Environmental | Generates notifications, beeps keypads, and sounds the siren to let people within the home domain know to evacuate the premises. Cannot be bypassed. |
| 24-Hour Inform | Will never generate an alarm, even if the system is armed. Upon triggering of the sensor will make the configured sound and send events to the operator domain. Can be bypassed. |

By defining such zones, a user can control how the security functions of SMA controller 120 react to various sensor triggers.

A user can also configure a display icon 750 associated with the sensor zone. In many cases, the available icons will be limited to one type of icon that graphically relates to the sensor type. But, for example, with a door/window sensor, icons can be made available that illustrate a door or a window as appropriate. FIG. 7 further illustrates a signal strength button 760 that, when selected, can illustrate strength of the signal between the wireless hub located within SMA controller 120 and the associated sensor.

The sensor zone information entered through the use of a display such as that illustrated in FIG. 7, can be stored in local data tables that are stored in memory 260 of SMA controller 120 (650). In addition, sensor zone information can also be transmitted via access domain 150 to servers in operator domain 160 for storage (e.g., database server 185) (660). By storing the sensor zone information in servers in the operator domain, the information is available to a user accessing a portal server 170. A user could then edit the sensor zone information through use of the portal rather than the SMA controller interface. Further, sensor zone information stored on database server 185 is retained even if an SMA controller suffers from an event that makes the SMA controller unusable. In such an event, a new SMA controller can be installed in home domain 110 and the information stored in operator domain 160 can be provided to the new SMA controller. This eliminates a need to manually reconfigure the new SMA controller with all sensor information.

Figure 8:
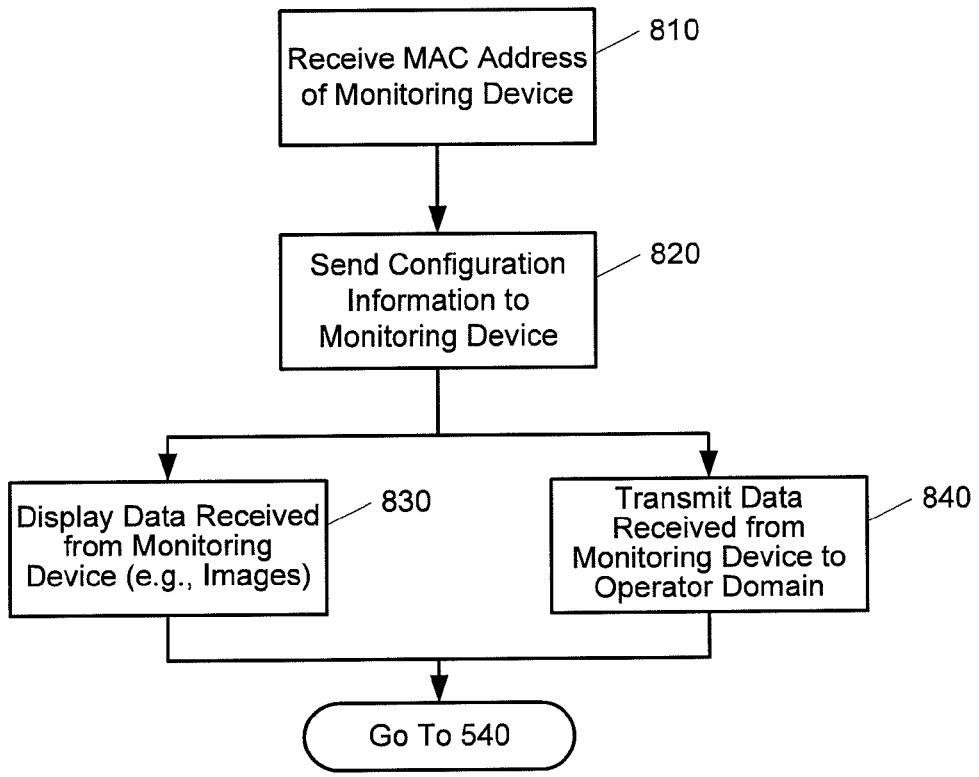
FIG. 8 is a simplified flow diagram illustrating steps performed to configure a home domain monitoring device, in accord with embodiments of the present invention.

FIG. 8 is a simplified flow diagram illustrating steps performed to configure a home domain monitoring device, in accord with embodiments of the present invention. As discussed above, SMA controller 120 can communicate with home domain monitoring devices 140, such as cameras and audio monitors. For example, a wireless camera can be activated and can communicate with SMA controller 120 via a router 125. During configuration, the SMA controller can detect the presence of a camera by receiving an MAC address of the camera from the router (810). The SMA controller can then configure the camera to communicate wirelessly with the router and the SMA controller (820). The SMA controller can pass a variety of information to the camera during a configuration phase, including, for example, an administrative user name and password, camera name, camera description, time zone, current time, language, user session name and password for list of users allowed to access the camera, network settings such as IP address and name servers, protocol settings, motion detection settings, and desired camera image settings such as resolution and video adjustments. In addition, the camera can provide information to the SMA controller for storage, such as, for example, device type, manufacturer, model number, and other control information.

Once the SMA controller and camera are configured, then images generated by the camera can be displayed on a display device associated with SMA controller 120 (830) or can be communicated to a portal server in operator domain 160 via a network in access domain 150 for display on a computer or mobile devices communicating with the portal server (840). SMA controller 120 can also store information related to the camera, such as, for example, a camera name, location of the camera, and relationship of the camera with a defined sensor zone. Embodiments of the present invention can provide both still and video images either on the SMA controller display or a portal display. An SMA controller can be configured to communicate with more than one monitoring device.

SMA controller 120 also has a capability of providing access to a variety of functionality through the use of widget programs. FIG. 4, discussed above, illustrates an example of a home screen display of SMA controller 120, showing a set of icons having associated widget programs (410). Some of the widgets provide for SMA controller functionality, such as, for example, security access, camera monitoring, and setting modification. Additionally, widgets can be provided to access SMA controller automation functionality such as thermostat control and lighting control. In addition, an SMA controller can provide display of user-selectable widgets (e.g., calendar, weather, news, traffic, and photos).

Figure 9:
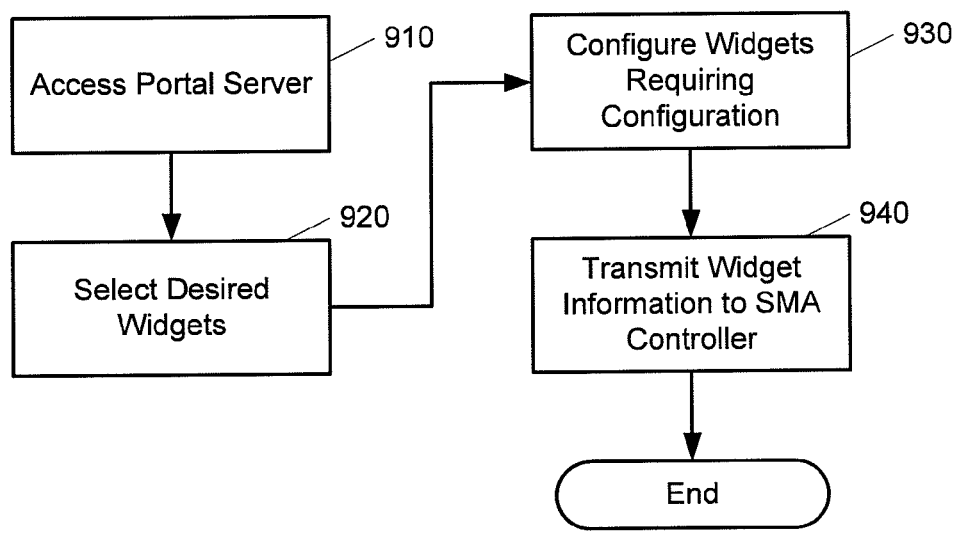
FIG. 9 is a simplified flow diagram illustrating steps performed in selecting widgets for use by an SMA controller, in accord with embodiments of the present invention.

FIG. 9 is a simplified flow diagram illustrating steps performed in selecting widgets for use by an SMA controller, in accord with embodiments of the present invention. A user can select those user selectable widget programs that are desired by accessing a portal server 170 (910). The user can view those widget programs that are available to the user and select those that the user wishes to install on the SMA controller (920). A user can also configure how the widget icons are displayed on the home screen (e.g., position of each icon) as well as provide any individual widget configuration information (e.g., zip code information for weather and traffic widgets) (930). Depending upon the purpose of a widget, a user may have a variety of options in configuring that widget.

By making widgets available on a portal server in the operator domain, the operator can control the nature and types of widgets available to a user. For example, an operator can define a series of option tiers for their users, with each tier having increasing numbers of available widgets or different type of widget functionality. Further, by making the widgets available through the portal, an operator can control the quality of the available widgets and ensuring that widgets will not affect the operability of SMA controller under the operator's control.

Once selected, code related to the widgets and widget setup information is transferred from servers in operator domain 160 to the associated SMA controller 120 in home domain 110 (940). That code information is stored in SMA controller 120, for example, in memory 260.

SMA controller 120 can also be configured to provide home automation functionality. As discussed above, a variety of hardware modules can be coupled to the SMA controller, allowing the SMA controller to communicate using protocols associated with those modules. In addition to the hardware configurability, SMA controller 120 is configured to communicate with a variety of devices selected to be controlled by the SMA controller. In a manner similar to that discussed above with regard to configuration of security sensors, SMA controller 120 is configured to detect available automated devices and display information regarding those devices. A user can then edit information about those devices and behavior of those devices through, for example, a touch screen interface coupled to SMA controller 120. In addition, a user can provide automation commands via accessing portal server 170 to modify those settings, or take immediate control of an automated device. Similarly, a user can take immediate control of automated devices from the touch screen of the SMA controller (e.g., through use of widgets such as "lights" and "thermostat," illustrated in FIG. 4). Configuration information related to the automated devices can be stored in a memory of SMA controller 120 or in a server located in operator domain 160.

In this manner, embodiments of the present invention provide configurable control over a variety of SMA devices in the home domain using a single controller. A variety of different device protocols can be provided for through the use of plug-in modules. Further flexibility is provided through configurable set up and control of security and automation devices. Additional functionality is provided through the use of user-selectable and user-configurable widgets.

An Example Computing and Network Environment

As shown above, the present invention can be implemented using a variety of computer systems and networks. An example of one such computing and network environment is described below with reference to FIGS. 10 and 11.

Figure 10:
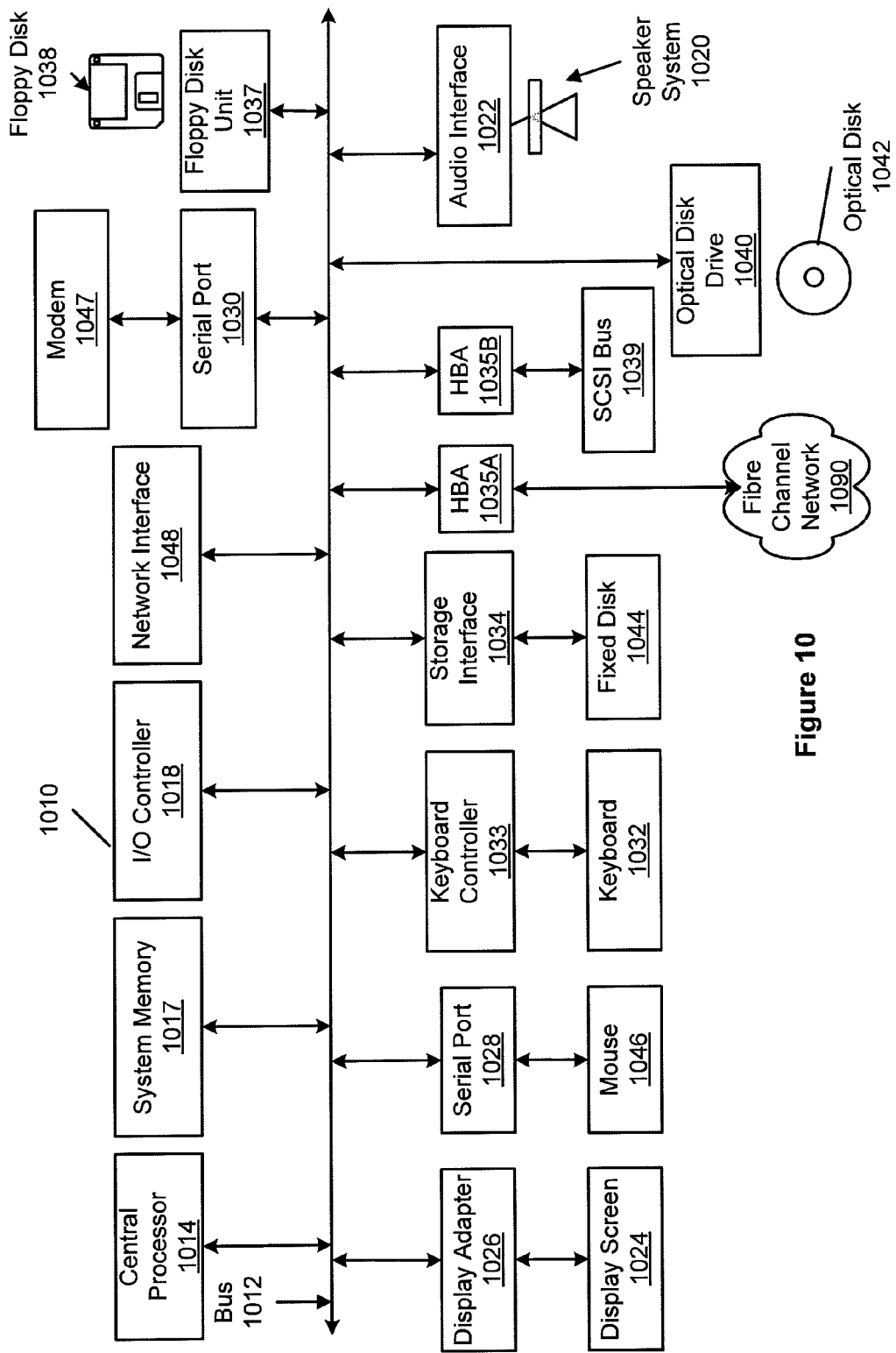
FIG. 10 depicts a block diagram of a computer system 1010 suitable for implementing aspects of the present invention (e.g., servers 165, portal server 170, backup server 175, telephony server 180, and database server 185).

FIG. 10 depicts a block diagram of a computer system 1010 suitable for implementing aspects of the present invention (e.g., servers 165, portal server 170, backup server 175, telephony server 180, and database server 185). Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer-readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer-readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present invention. The devices and subsystems can be interconnected in different ways from that shown in FIG. 10. The operation of a computer system such as that shown in FIG. 10 is readily known in the art and is not discussed in detail in this application. Code to implement the present invention can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
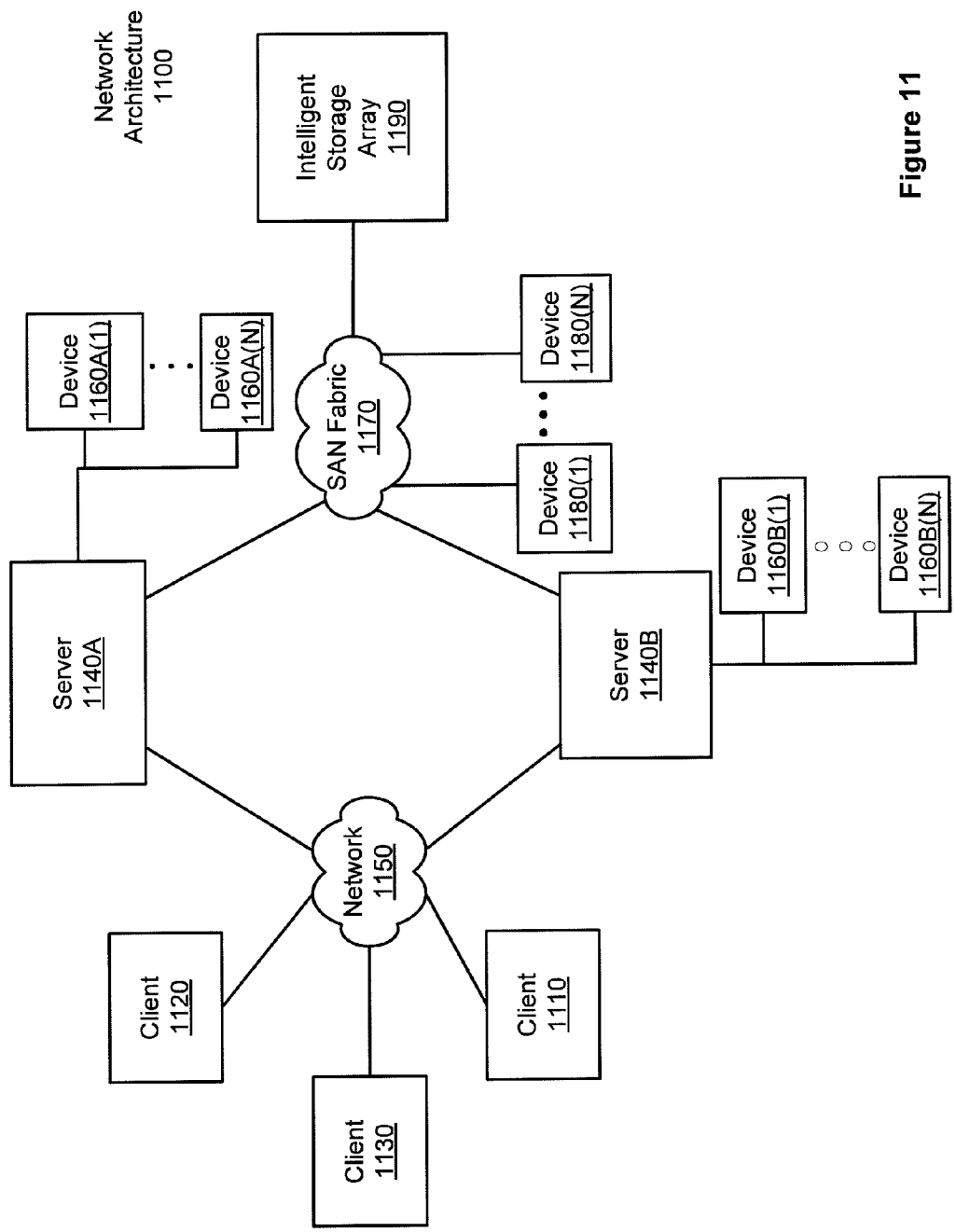
FIG. 11 is a block diagram depicting a network architecture 1100 in which client systems 1110, 1120 and 1130, as well as storage servers 1140A and 1140B (any of which can be implemented using computer system 1010), are coupled to a network 1150.

FIG. 11 is a block diagram depicting a network architecture 1100 in which client systems 1110, 1120 and 1130, as well as storage servers 1140A and 1140B (any of which can be implemented using computer system 1010), are coupled to a network 1150. Storage server 1140A is further depicted as having storage devices 1160A(1)-(N) directly attached, and storage server 1140B is depicted with storage devices 1160B(1)-(N) directly attached. Storage servers 1140A and 1140B are also connected to a SAN fabric 1170, although connection to a storage area network is not required for operation of the invention. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to network 1150. Client systems 1110, 1120 and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1010). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A device comprising:
a memory storing configuration information for one or more security sensors, configuration information for one or more monitoring devices, and configuration information for one or more automation devices;
a first communication interface for communication with the one or more security sensors;
a second communication interface for communication with a remote server; and
a processor, coupled to the memory and the first and second communication interfaces, configured to interpret an event signal received via the first communication interface from a first security sensor of the one or more security sensors, wherein said interpreting is performed in accord with configuration information associated with the first security sensor, and transmit data associated with the event signal to the remote server using the second communication interface, wherein the data associated with the event signal conforms with the configuration information associated with the first security sensor, the configuration information including an association between the first security sensor and at least one zone and an association of a response of the device with the at least one zone, the response including the interpreting the event signal and the transmitting the data.

2. The device of claim 1 further comprising:
a display coupled to the processor; and
the processor further configured to display data associated with the event signal using the display, wherein the data associated with the event signal conforms with the configuration information associated with the first security sensor.

3. The device of claim 1 further comprising:
an input device coupled to the processor; and
the processor further configured to receive, from the input device, configuration information associated with one or more of a security sensor, a monitoring device and an automation device, and store the received configuration information in the memory.

4. The device of claim 1 wherein the processor is further configured to:
receive, from the remote server via the second communication interface, configuration information associated with one or more of a security sensor, a monitoring device and an automation device; and
store the configuration information in the memory.

5. The device of claim 1 wherein the processor is further configured to:
read, from the memory, configuration information associated with one or more of a security sensor, a monitoring device and an automation device; and
transmit the configuration information to the remote server, using the second communication interface.

6. The device of claim 1 further comprising:
a third communication interface, coupled to the processor, for communication with the one or more monitoring devices; and
the processor further configured to generate configuration information associated with a first monitoring device of the one or more monitoring devices, configure the first monitoring device using an application programming interface associated with a type of the first monitoring device, and transmit, to the first monitoring device, the configuration information associated with the first monitoring device, using the third communication interface.

7. The device of claim 1 wherein the processor is further configured to:
couple among a third communication interface—and the processor for communication with the one or more monitoring devices;
receive, using the third communication interface, data from a first monitoring device of the one or more monitoring devices; and
transmit the data from the first monitoring device to the remote server, using the second communication interface.

8. The device of claim 1 further comprising:
a display coupled to the processor;
a third communication interface, coupled to the processor, for communication with the one or more monitoring devices; and
the processor further configured to receive, using the third communication interface, data from a first monitoring device of the one or more monitoring devices, in response to a request by a user of the device, and display, using the display, the data from the first monitoring device.

9. The device of claim 1 further comprising:
a third communication interface, coupled to the processor, for communication with the one or more monitoring devices; and
the processor further configured to transmit, using the third communication interface, control information to a first monitoring device of the one or more monitoring devices, wherein the control information conforms to configuration information associated with the first monitoring device.

10. The device of claim 1 further comprising:
a third communication interface, coupled to the processor, for communication with the one or more automation devices; and
the processor further configured to transmit, using the third communication interface, control information to a first automation device of the one or more automation devices, wherein the control information conforms to configuration information associated with the first automation device.

11. The device of claim 10 further comprising:
an input device coupled to the processor; and
the processor further configured to receive the control information from the input device.

12. The device of claim 10 wherein the processor is further configured to receive the control information from the remote server, using the second communication interface.

13. The device of claim 1, wherein the configuration information for the one or more security sensors comprises:
identification of a zone of a sensor of the one or more sensors;
identification of a type of the sensor;
identification of a unique identifier for the sensor; and
identification of a zone function for the sensor.

14. The device of claim 1 further comprising:
a display coupled to the processor;
the memory further storing instructions, executable by the processor, associated with one or more widget application programs and configuration information associated with the one or more widget application programs; and
the processor further configured to execute instructions associated with a first widget application program, and display information generated by the first widget application program using the display.

15. The device of claim 14, wherein the second communication interface is further configured to communicate with a remote portal server;
the one or more widget application programs are selected from a set of widget application programs using the remote portal server;
and the one or more widget application programs are distributed to the device by the remote portal server.

16. An apparatus comprising:
means for storing configuration information for one or more security sensors, configuration information for one or more monitoring devices, and configuration information for one or more automation devices;
first means for communicating with the one or more security sensors;
second means for communicating with a remote server;
means for interpreting an event signal received via the first means for communicating from a first security sensor of the one or more security sensors, wherein said means for interpreting performs said interpreting in accord with configuration information associated with the first security sensor; and
means for transmitting data associated with the event signal to the remote server using the second means for communicating, wherein the data associated with the event signal conforms with the configuration information associated with the first security sensor, the configuration information including an association between the first security sensor and at least one zone and an association of a response of the apparatus with the at least one zone, the response including the interpreting the event signal and the transmitting the data.

17. The apparatus of claim 16 further comprising:
means for displaying data associated with the event signal, wherein the data associated with the event signal conforms with the configuration information associated with the first security sensor.

18. The apparatus of claim 16 further comprising:
means for inputting configuration information associated with one or more of a security sensor, a monitoring device and an automation device.

19. The apparatus of claim 16 further comprising:
means for receiving from the remote server, via the second means for communicating, configuration information associated with one or more of a security sensor, a monitoring device and an automation device.

20. The apparatus of claim 16 further comprising:
means for reading, from the means for storing, configuration information associated with one or more of a security sensor, a monitoring device and an automation device; and
means for transmitting the configuration information to the remote server, via the second means for communicating.

21. The apparatus of claim 16 further comprising:
means for receiving data from a first monitoring device of the one or more monitoring devices; and
means for transmitting the data from the first monitoring device to the remote server, via the second means for communicating.

22. The apparatus of claim 16 further comprising:
means for transmitting control information to a first monitoring device of the one or more monitoring devices, wherein the control information conforms to configuration information associated with the first monitoring device.

23. The apparatus of claim 16 further comprising:
means for transmitting control information to a first automation device of the one or more automation devices, wherein the control information conforms to configuration information associated with the first automation device.

24. The apparatus of claim 16 further comprising:
means for storing instructions associated with one or more widget application programs and configuration information associated with the one or more widget application programs;
means for executing instructions associated with a first widget application program; and
means for displaying information generated by the first widget application program.

25. A method performed by a security, monitoring and automation controller, said method comprising:
storing configuration information for one or more security sensors, configuration information for one or more monitoring devices, and configuration information for one or more automation devices, wherein said storing is performed using a memory readable by the security, monitoring and automation (SMA) controller;
interpreting an event signal received from a first security sensor of the one or more security sensors, wherein said interpreting is performed in accord with configuration information associated with the first security sensor; and
transmitting data associated with the event signal to a remote server, wherein the data associated with the event signal conforms with the configuration information associated with the first security sensor, the configuration information including an association between the first security sensor and at least one zone and an association of a response of the SMA controller with the at least one zone, the response including the interpreting the event signal and the transmitting the data.

26. The method of claim 25 further comprising:
displaying data associated with the event signal, wherein said displaying is performed using a display coupled to the SMA controller, wherein the data associated with the event signal conforms with the configuration information associated with the first security sensor.

27. The method of claim 25 further comprising:
receiving, from the remote server, configuration information associated with one or more of a security sensor, a monitoring device and an automation device; and
storing the configuration information in the memory.

28. The method of claim 25 further comprising:
reading, from the memory, configuration information associated with one or more of a security sensor, a monitoring device and an automation device; and
transmitting the configuration information to the remote server.

29. The method of claim 25 further comprising:
generating configuration information associated with a first monitoring device of the one or more monitoring devices;
configuring the first monitoring device using an application programming interface associated with a type of the first monitoring device; and
transmitting the configuration information associated with the first monitoring device to the first monitoring device.

30. The method of claim 25 further comprising:
transmitting control information to a first monitoring device of the one or more monitoring devices, wherein the control information conforms to configuration information associated with the first monitoring device.

31. The method of claim 25 further comprising:
transmitting control information to a first automation device of the one or more automation devices, wherein the control information conforms to configuration information associated with the first automation device.

32. The method of claim 25 further comprising:
storing instructions, executable by the SMA controller, associated with one or more widget application programs, wherein said storing is performed using the memory;
storing configuration information associated with the one or more widget application programs, wherein said storing is performed using the memory; and
executing instructions associated with a first widget application program of the one or more widget application programs; and
displaying information generated by the first widget application program, using a display coupled to the SMA controller.

33. The method of claim 25 further comprising:
selecting the one or more widget application programs from a set of widget application programs, wherein said selecting is performed using a remote portal server coupled to the SMA controller; and
distributing the one or more widget application programs to the SMA controller by the remote portal server.

* * * * *